Jan. 9, 1934.   L. SEMAR   1,943,192
RELEASABLE SINKER
Filed Nov. 11, 1932   2 Sheets-Sheet 1
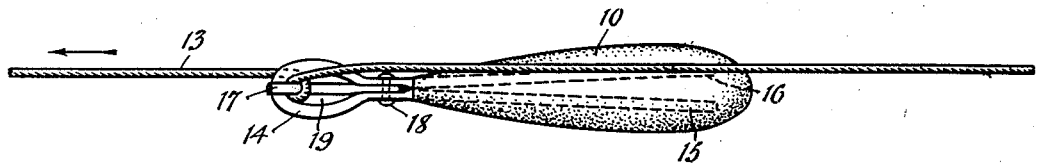
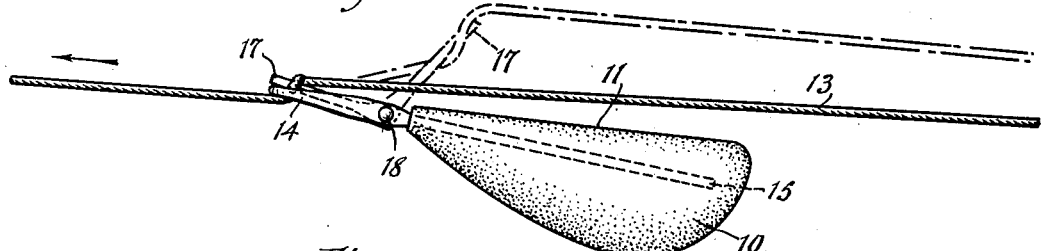
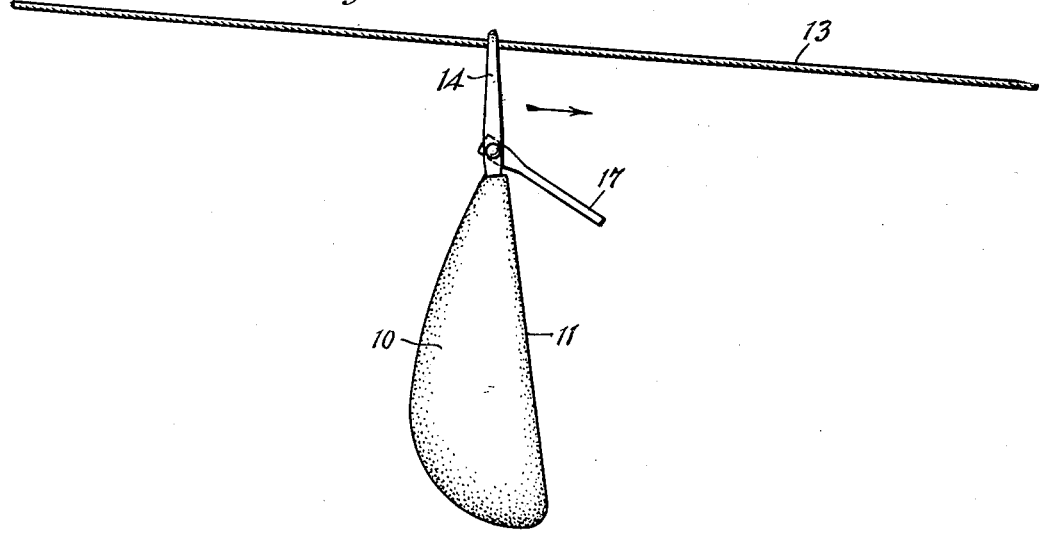
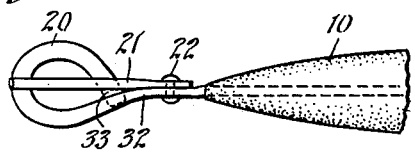
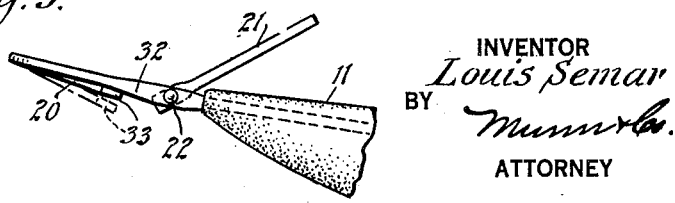
WITNESSES
Edw. Thorpe
Albert J. Clark
INVENTOR
Louis Semar
BY Munn & Co.
ATTORNEY Jan. 9, 1934. L. SEMAR 1,943,192
RELEASABLE SINKER
Filed Nov. 11, 1932 2 Sheets-Sheet 2
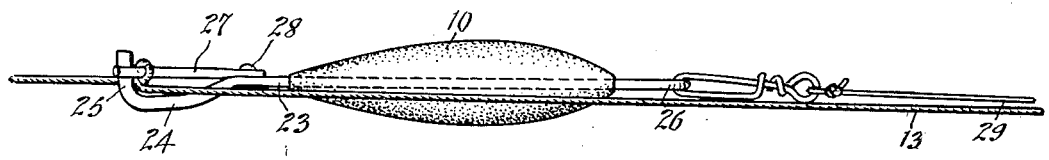
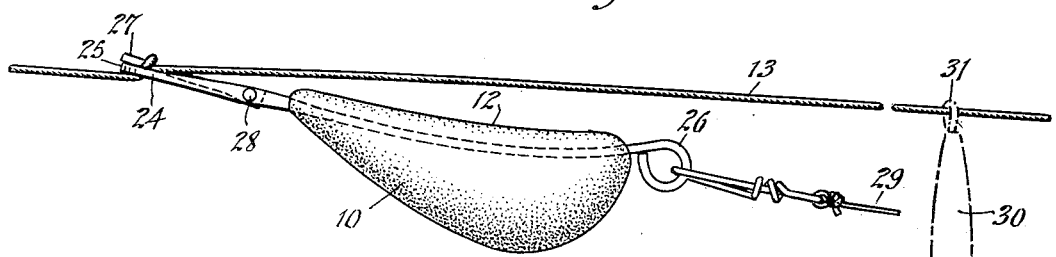
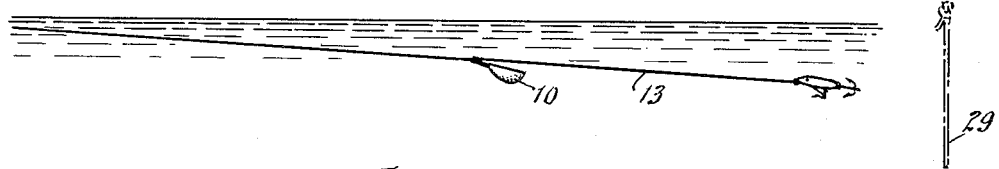
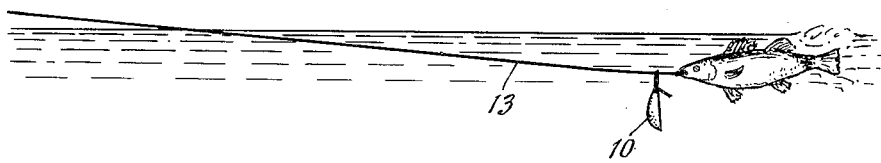
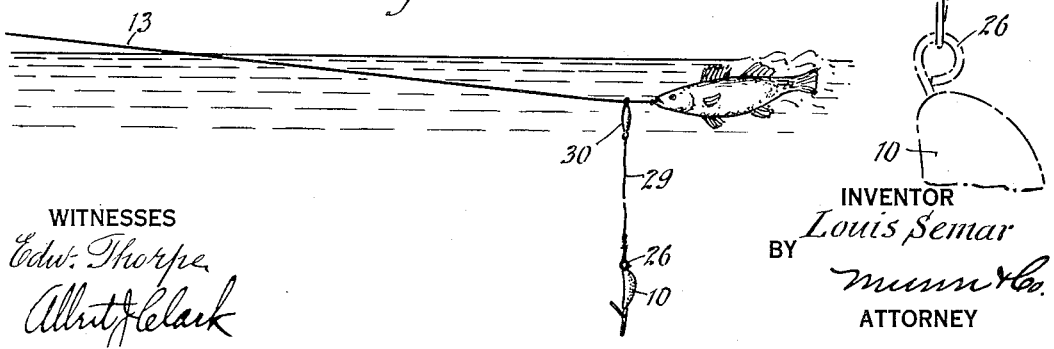
INVENTOR
Louis Semar
BY Munn & Co.
ATTORNEY Patented Jan. 9, 1934

1,943,192

UNITED STATES PATENT OFFICE 1,943,192

RELEASABLE SINKER

Louis Semar, Anacortes, Wash.

Application November 11, 1932
Serial No. 642,301

6 Claims. (Cl. 43—28)

This invention relates to sinkers for fishing lines and has for an object to provide a sinker having means for releasingly attaching it in fixed position to a fishing line and which will be released from fixed position by a pull on the free end of the line, such as by the pull by a fish taking the hook.

In trolling for fish with a pole, reel and line, it is desirable to reel the line in as near as possible to the hook in order to prevent thrashing of the fish on the hook and to afford an opportunity to lift the fish into the boat by means of a hand seine. As the usual sinker is generally affixed to the line at a distance of approximately twenty feet from the bait, it is only possible to reel the line in to the point of attachment of the sinker with the line. The present invention, therefore, provides a sinker which is released from fixed engagement with the line by the pull of the fish on the line, whereby the line may be reeled in to substantially its full length.

Another object of the invention is to provide a sinker arrangement by which the fish is unable to obtain a direct pull on the sinker, thereby lessening the danger of tearing the line.

The invention is shown in the accompanying drawings, in which

Figure 1 is a top plan view of the sinker in fixed position on a line;

Fig. 2 is a side view of the sinker and, in dotted outline, the line about to be released from fixed engagement therewith;

Fig. 3 is a side view of the sinker released from fixed engagement with the line;

Fig. 4 is a top plan view of a modified form of the invention, with a portion of the weight of the sinker broken away;

Fig. 5 is a side view of the sinker shown in Fig. 4 in open position;

Fig. 6 is a top plan view of still another form of a releasable sinker in fixed engagement on a line;

Fig. 7 is a side view of the sinker shown in Fig. 6 and, in dotted outline, the remaining portion of the sinker shown in Fig. 6;

Fig. 8 is a view showing the sinkers illustrated in Figs. 1 to 5, inclusive, applied to a line;

Fig. 9 is a view of the sinker shown in Fig. 8 released from fixed engagement, and Fig. 10 is a view showing the sinker illustrated in Figs. 6 and 7 released from fixed engagement with the line.

Each of the sinkers shown in the drawings embodying the invention has a weight 10 which may be of any desired shape or configuration which will not interfere with the line to which it is attached. Preferably, it has a flat longitudinal upper edge 11, as shown in the forms illustrated in Figs. 1 to 5, inclusive, or a concave longitudinal upper edge 12, as shown in Fig. 7. The flat edge 11, or concave edge 12, prevents the weight 10 from interfering with the portion of the line 13 above the sinker when the sinker is in fixed engagement on the line.

The weight 10 in the form of the invention shown in Figs. 1 to 3, inclusive, is affixed at one end to a looped member 14, the ends 15 and 16 of which are embedded in the body of the weight in diverging relation. A toggle arm 17 is pivotally connected at one end between opposite side portions of the looped member 14 on a pin 18, which pin also rivets the sides of the looped member together, forming a closed throat 19, through which the line 13 is reeved for slidably connecting the sinker to the line.

In order to secure the sinker in fixed position on the line, one or more turns of the line are wound around the outer end of the toggle arm 17 and the line drawn tight with the end of the toggle member positioned against the end of the looped member 14. This construction puts a bight in the line which is drawn against the upper end of the throat 19, thereby holding the sinker in fixed position on the line. When in this position, a pull on the free end of the line will cause the toggle arm 17 to swing on the pivot 18 to a rearward position, in which position the turns of the line on the toggle arm will be stripped therefrom, thus releasing the sinker from fixed engagement and to a sliding engagement, as shown in Fig. 3.

In the form of the invention shown in Figs. 4 and 5, one end of a member 32 is embedded in the body of the weight 10, with a projecting end bent to form a closed loop 20, through which the line may be reeved for slidably connecting the sinker thereto, or as shown in Fig. 5, the end 33 of the loop 20 may be sprung out of engagement with the member 32, thereby providing a split opening through which the line may be passed for connecting the sinker to the line. A toggle arm 21 is pivoted to the member 32 on a pin 22 between the loop 20 and the weight 10. In this form of construction, the sinker is secured in fixed position on the line in the manner hereinbefore described, by winding one or more turns of the line about the end of the toggle member 21, and with the said arm drawn against the end of the loop 20. A pull on the free end of the line will move the arm to a position where the line will slip over the end of the toggle arm as hereinbefore described.

In the form of the invention shown in Figs. 6 and 7, a member 23 has its central portion embedded in a weight 10, and with a projecting end 24 bent laterally, as at 25, and the opposite projecting end formed into a closed loop 26. The lateral bent portion 25 cooperates with a toggle arm 27 pivoted to the member 23 on the pin 28 for securing the line in fixed position thereon in the manner hereinbefore described, but in this form when the line is released from the toggle arm 27, the laterally bent end 25 is freed from engagement with the line, permitting the weight to drop to a suspended position, in which position it is supported by a drop line 29 connected at one end to the loop 26 and at the other end to a weight 30 slidably supported on the line by means of an eye 31.

It is to be understood that in these several constructions, the sinker will be released from fixed engagement with the line by a pull on the free end of the line, such as by the pull of a fish taking the bait, and when released from fixed engagement with the line, the sinker is slidably suspended on the line so that substantially the entire length of the line may be reeled in to draw the fish close to the end of the pole.

What is claimed is:

1. A sinker for fishing lines, including a weight, a member secured to said weight, said member having a bent portion at its forward end, and a second member pivoted to said first member between the said bent portion and the said weight, said second member being swingable from an open to a closed position with said bent portion, in which latter position the end portion of the said second member is in contact with said bent portion.

2. A sinker for fishing lines, including a weight, means adapted to slidably connect said weight to a fishing line, and means pivoted at one end to said first-mentioned means about which last-mentioned means the line is adapted to be wound to form a bight for securing the weight in fixed position on the said line, said last-mentioned means being swingable to an angular position with the first-mentioned means by a pull in one direction on the line for releasing the weight from said fixed position to a slidable position on said line.

3. In a line and sinker, a flexible line, a weight, a member secured to said weight having a lateral bent portion, and means pivoted at one end to said member and adapted to contact at its other end with the said bent portion about which means the line is adapted to be wound for securing the weight in fixed position on the line, said means being swingable from a contacting position with said bent portion to an open position therewith for releasing the weight from a fixed position on the line.

4. In a line and sinker, a flexible line, a weight, a member secured at one end to said weight and having a bent portion at its opposite end, and a second member pivoted to said first-mentioned member between the bent portion and its connection with the weight and co-operating with said bent portion for securing said weight in fixed position on the line, said second member being swingable on its pivot to an angular position with said bent portion by a pull in one direction on the line for releasing the weight from a fixed position thereon.

5. A sinker for fishing lines, including a weight, a member secured to said weight, said member having a laterally bent end portion, and a bar pivoted at one end to said member and adapted to contact at its opposite end with said bent end portion, said bar being adapted to have the line wound thereon to form a bight for connecting the weight in fixed position on the line, said bar being swingable on its pivot to an angular position out of contact with the bent end portion for releasing the sinker from fixed position on the line.

6. The combination with a fishing line, of a sinker, disengageable means connecting the sinker in fixed position on said line, said means being disengaged by a pull in one direction on said line to drop the sinker from said fixed position for movement with respect to the line, and a drop line having one end connected with the sinker and its opposite end slidably connected with said fishing line, for the purpose of sliding the sinker along the fishing line when released as aforesaid.

LOUIS SEMAR.